United States Patent
Caggioni et al.

(10) Patent No.: US 10,142,091 B2
(45) Date of Patent: Nov. 27, 2018

(54) POWER OPTIMIZATION MECHANISMS FOR FRAMERS BY USING SERIAL COMPARISON IN FRAME ALIGNMENT PROCESS

(71) Applicant: MACOM Connectivity Solutions, LLC, Lowell, MA (US)

(72) Inventors: Francesco Caggioni, Winchester, MA (US); Dimitrios Giannakopoulos, Andover, MA (US)

(73) Assignee: MACOM CONNECTIVITY SOLUTIONS, LLC, Lowell, MA (US)

( * ) Notice: Subject to any disclaimer, the term of this patent is extended or adjusted under 35 U.S.C. 154(b) by 0 days.

(21) Appl. No.: 15/389,179

(22) Filed: Dec. 22, 2016

(65) Prior Publication Data

US 2018/0183565 A1    Jun. 28, 2018

(51) Int. Cl.
*H04L 7/00* (2006.01)
*H04J 3/06* (2006.01)

(52) U.S. Cl.
CPC .......... *H04L 7/0054* (2013.01); *H04J 3/0608* (2013.01); *H04L 7/0004* (2013.01); *H04L 7/0016* (2013.01); *H04L 7/0079* (2013.01)

(58) Field of Classification Search
CPC ...... H04W 56/001; H04W 56/00; H04L 1/00; H04L 7/0054; H04L 7/0004; H04L 7/0016; H04L 7/0079
See application file for complete search history.

(56) References Cited

U.S. PATENT DOCUMENTS

| | | | |
|---|---|---|---|
| 5,757,869 A | * | 5/1998 | Sands ............... H04J 3/0608 370/506 |
| 6,775,799 B1 | | 8/2004 | Giorgetta et al. |
| 7,362,779 B1 | * | 4/2008 | Zabezhinsky ....... H04J 3/1611 370/512 |
| 2003/0208709 A1 | | 11/2003 | Kassa |
| 2008/0031284 A1 | | 2/2008 | Alderson et al. |
| 2013/0262941 A1 | | 10/2013 | Wang |
| 2013/0329754 A1 | * | 12/2013 | Shin .................... H04L 25/14 370/536 |
| 2014/0189459 A1 | | 7/2014 | Vijayaraghavan |

FOREIGN PATENT DOCUMENTS

| EP | 1239624 | 9/2002 |
|---|---|---|
| WO | WO9731441 | 8/1997 |

* cited by examiner

*Primary Examiner* — Shuwang Liu
*Assistant Examiner* — Sung Ahn (57) ABSTRACT

System and method of frame alignment at a receiver with power optimization mechanisms. A framer uses one or more comparators to search for the FAW in the incoming data, with each comparator configured to serially compare multiple windows of a parallel M-bit block (as provided from a parallel data bus) with the FAW. Multiple comparators in the framer may operate in parallel to search for the FAW at different windows. This configuration can significantly reduce the comparator count and so the gate count as well as the chip area in a framer. Power consumption can be advantageously reduced as one comparator operating serially consumes less power than multiple comparators in parallel because less gate toggling is involved.

18 Claims, 8 Drawing Sheets

POWER OPTIMIZATION MECHANISMS FOR FRAMERS BY USING SERIAL COMPARISON IN FRAME ALIGNMENT PROCESS

CROSS-REFERENCE TO RELATED APPLICATIONS

This application is related to the commonly-assigned co-pending U.S. patent application Ser. No. 15/389,140, entitled "POWER OPTIMIZATION MECHANISMS FOR FRAMERS BY SELECTIVELY DEACTIVATING FRAME ALIGNMENT PROCESS," filed on Dec. 22, 2016; and to the commonly-assigned co-pending U.S. patent application Ser. No. 15/389,165, entitled "POWER OPTIMIZATION MECHANISMS FOR FRAMERS BY SERIALIZING FRAME ALIGNMENT PROCESSES FOR MULTIPLE LANES," filed on Dec. 22, 2016.

TECHNICAL FIELD

The present disclosure relates generally to the field of signal processing in communications and, more specifically, to the field of frame alignment in signal processing.

BACKGROUND OF THE INVENTION

In communications systems, a transmitter sends data streams to a receiver in symbols, such as bits of data. In frame-based data transmission, data is transmitted in frames of a fixed length, and the transmitter and the receiver agree ahead of time on a selected frame synchronization scheme, including choice of a synchronization marker. At the transmitter, the synchronization marker is embedded in a frame as frame-based point of reference such that the receiver can identify boundaries of the frames. The synchronization marker is commonly known as frame alignment signal (FAS), frame alignment word (FAW), framing pattern, or frame alignment pattern (FAP).

Typically, an embedded FAW includes a fixed number of bits in a pattern known at the receiver side and is located in the overhead section of the frame, usually the first time slot in a frame before the payload data. For an alignment mechanism to be maintained, a FAW may be transmitted in every frame, or in another predetermined frequency, such as in every 3rd frame, every $5^{th}$ frame, and etc.

Correspondingly, the receiver utilizes a synchronization mechanism to detect the FAW in the data stream and thereby synchronize the data stream. More specifically, one or more framer circuits (or referred to as "framers" herein) in the receiver perform a frame alignment process to detect the boundary of a respective transmission frame and align the internal or embedded data to the data stream. Once frame synchronization (or frame alignment) is obtained, the data stream is subject to further data processing at the receiver.

Low power consumption in integrated circuits has increasingly become important in high speed communications systems, especially in power-sensitive applications, such as data center installations (e.g., server cards, Top-of-Rack (ToR) switches, board interconnection), optical modules which typically have a tight power budget, high density Ethernet cards in which cooling the system is critical and costly, and others.

In conventional high-speed PHY chips, after frame alignment is obtained, a framer continues to actively search for the fixed FAW in expected frame locations in a periodic fashion, and declares "out-of-frame" when the there is no match for a number of times. Thus, framers are kept active for the whole time the system is operational. The continuous operations of framers contribute to undesirable significant power consumption in a receiver.

Moreover, current framers use multiple identical copies of the same circuit (typically comparators) to compare a fixed FAW with the incoming data in parallel, each comparator looking at a different portion (a "window") of the parallel data bus. The number of comparators equals to the number of all the windows to be checked with respect to the parallel data bus. In addition, current receivers use one framer for each physical lane. Due to the high number of comparator gates used in such configurations, the power consumption associated with the toggling of these gates is undesirably high.

SUMMARY OF THE INVENTION

Accordingly, disclosed herein provide power optimization mechanisms for frame alignment in receivers of communication systems.

In one aspect of the present disclosure, embodiments of the present disclosure utilize a framer capable of entering an inactive state after frame alignment is achieved and waking up from the inactive state responsive to an indication that data processing at the receiver becomes "out-of-frame" again. In some embodiments, an "out-of-frame" indication is generated based on detection of an error in the processed data stream. For example, such an error may correspond to an excessive number of uncorrectable errors as detected by a forward error correction (FEC) decoder coupled to the framer. Upon detection, the FEC decoder sends a restart signal to the framer for restarting the frame alignment process. The frame alignment processes (or frame aligning processes) for the data streams associated with the same channel can be disabled at the same time when frame alignment is achieved for all these data streams.

According to embodiments of the present disclosure, when a framer is in an inactive state, the circuits used to perform the frame alignment process in the framer can be powered down or otherwise placed in a power reduction mode, e.g., through clock gating or any other suitable mechanism that is well known in the art. In modern communication networks, data transmission is generally reliable, and, once achieved, frame synchronization can be maintained for extended time at a receiver. Thus, continuous frame alignment process is not necessary. Therefore, by disabling the frame alignment process when it is not needed, significant power reduction can be advantageously obtained.

According to another aspect of the present disclosure, embodiments of the present disclosure provide a framer using one or more comparators to search for the FAW in the incoming data, with each comparator configured to serially compare multiple windows of a parallel M-bit block (as provided from a parallel data bus) with the FAW. Multiple comparators in the framer may operate in parallel to search for the FAW at different windows. Compared with a conventional framer where the number of comparators is equal to the number of windows and all the windows are checked simultaneously, this configuration can significantly reduce the requisite comparator count and so the gate count as well as the chip area in a framer, thereby advantageously reducing associated power consumption.

According to still another aspect of the present disclosure, embodiments of the present disclosure provide a framer configured to process data streams from multiple physical lanes and/or multiple channels serially. Compared with a conventional receiver having one framer per channel or per lane, this configuration can also significantly reduce framer count and so the gate count as well as the chip area in a receiver, thereby advantageously reducing associated power consumption.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

BRIEF DESCRIPTION OF THE DRAWINGS

Embodiments of the present invention will be better understood from a reading of the following detailed description, taken in conjunction with the accompanying figures, in which like reference characters designate like elements and in which.

POWER OPTIMIZATION MECHANISMS FOR FRAMERS BY USING SERIAL COMPARISON IN FRAME ALIGNMENT PROCESS

Overall, embodiments of the present disclosure provide a receiver capable of disabling a frame alignment process once frame alignment is achieved. The frame alignment process can be restarted based on detection of a greater-than-threshold error which is used as an indication that the data processing at the receiver becomes "out-of-frame," e.g., as detected through a forward error correction process. In addition, according to embodiments of the present disclosure, a comparator in a framer is configured to successively compare multiple windows of a block of parallel data (as provided by an M-bit parallel data bus) with a predetermined framing pattern (e.g., a stored frame alignment word (FAW)). Moreover, according to embodiments of the present disclosure, a framer can successively perform frame alignment processes for data of multiple lanes and/or multiple channels.

Figure 1:
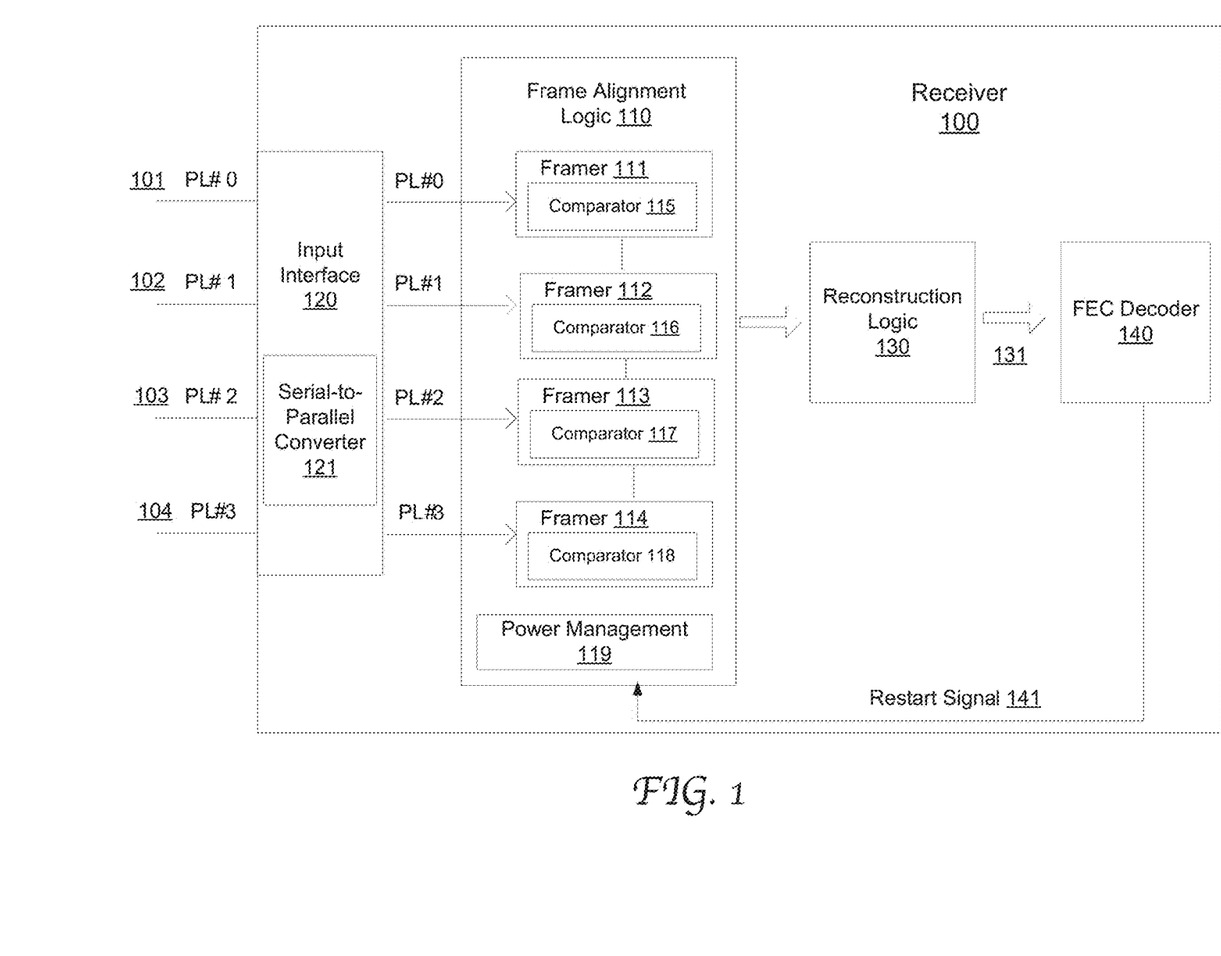
FIG. 1 illustrates the configuration of an exemplary receiver including frame alignment logic configured to enter a power reduction state after frame alignment is achieved in accordance with an embodiment of the present disclosure.

FIG. 1 illustrates the configuration of an exemplary receiver 100 including frame alignment logic 110 configured to enter a power reduction state after frame alignment is achieved in accordance with an embodiment of the present disclosure. The receiver 100 includes an input interface 120, the frame alignment logic 110, reconstruction logic 130 and an FEC decoder 140. It will be appreciated that the receiver 100 may include a wide range of other logic components that are well known in the art.

In the illustrated example, the input interface 120 receives the data streams 101-104 transmitted through 4 physical lanes (PL#0-#3). Each data stream is composed of a sequence of frames, each frame in a fixed length. A respective frame in a data stream includes a FAW, a payload and an error-correcting code. Typically the frames in a data stream share the same FAW, while different data streams use different FAWs. It will be appreciated that the present disclosure is not limited to any specific frame alignment scheme or frame alignment process. Nor is it limited to any specific number of lanes, channels or framers.

At the input interface 120, the serial-to-parallel converter 121 converts a sequence of bits in a data stream into a block of M-bit that can be provided to a framer in parallel through an M-bit parallel data bus (not explicitly shown). The framer thus can compare the block with a stored FAW to locate the FAW value in the data stream in a lower frequency than the bit transmission frequency.

The frame alignment logic 110 uses 4 framers 111-114 to perform respective frame alignment processes on the data streams from the 4 lanes 101-104. Each framer includes one or more comparators (e.g., 115, 116, 117 or 118) for comparing the data stream with an assigned and locally stored FAW. The 4 lanes may carry data traffic from a single channel or multiple channels. Though not explicitly shown, each framer also includes shifting logic, validation logic and locking logic and so on, which can be respectively implemented in any suitable manner that is well known in the art without departing from the scope of the present disclosure.

In a frame alignment process, a framer (111, 112, 113 or 114) searches for the assigned FAW in the corresponding data stream to locate boundaries of the frames. More specifically, the shifting logic in the framer (111, 112, 113 or 114) outputs a plurality of windows of an M-bit block in a certain sequence. The comparator(s) (115, 116, 117 or 118) in the framer (111, 112, 113 or 114) compares the plurality of windows to the assigned FAW. As described in greater detail with reference to FIGS. 3-4, a comparator in a framer may successively compare multiple windows to the assigned FAW for a given M-bit block.

After locating the FAW in the data stream, the validation logic in the framer may re-check for the re-occurrence of the same pattern at next expected location in the data stream, which is apart from the initial location by the fixed frame window (since the pattern is repetitive). This can be repeated for a number of times in order to validate that it is the correct pattern and not a false mimicking of the pattern by semi-random data. Once validated, data processing at the receiver transitions to an "in-frame" state, or becomes so-called "locked" as declared by the locking logic in the framer.

The reconstruction logic 130 aggregates and processes the data streams output from the frame alignment logic 110 and thereby supplies a processed (or reconstructed) data stream 131 to the FEC decoder 140. The reconstruction logic 130 may include various functional components that are well known in the art, such as modules for alignment deskew, lane reorder, alignment removal, transcoding, block distribution, and etc.

The FEC decoder 140 performs error detection and (optionally) error correction on the processed data stream 131 based on the error-correcting codes in the frames, for example Reed-Solomon (RS) code. The FEC decoder is capable of correcting a certain number of symbol-errors in a block of a particular number of symbols.

When in-frame, a continuous check is needed to verify if the perceived frame location is still correct. According to the conventional art, a frame alignment process continues during the in-frame state, where the framer keeps actively searching for the fixed FAW in expected frame locations (in a periodic fashion), and can declare "out-of-frame" when there is no match for a number of times. However, in modern communication networks, data transmission is generally reliable and data processing at a receiver can stay in-frame for the vast majority of the time.

According to embodiments of the present disclosure, once the frame alignment logic 110 declares in-frame, the frame alignment processes are disabled. For example, the comparators, shifting logic, validation logic and locking logic in the framers are powered down or otherwise placed in a low power mode to save power, such as sleeping mode, clock gating, or any other power-saving measure that is well known in the art.

The frame alignment logic may include a power management module 119 that stays active in the low power state while the rest of the frame alignment logic 110 is inactive.

The power management module 119 can receive a restart signal 114 and accordingly wakes up the framers 111-114. In some other embodiments, each framer may include its own power management component that can process a wake-up signal directed to the framer. A power management module according to the present disclosure can be implemented in any suitable manner that is well known in the art.

In some embodiments, the power management module 119 is configured to control each framer to enter/exit a low power state individually, e.g., by powering-up/powering-down the framer. For example, in the case that each framer processes a respective data stream (e.g., associated with a respective physical lane), a frame alignment process for a specific data stream can be individually disabled once frame alignment is achieved for the data stream. In some other embodiments, the power management module is configured to control a group of framers (e.g., those associated with the same channel) together for entering/exiting a low power state. For example, the frame alignment processes for the data streams associated with the same channel can be disabled/enabled at the same time as controlled by the power management module. As illustrated in FIG. 1, if the framers 111-114 are used to process data streams from the same channel, a frame alignment success event occurs after all the framers 111-114 have declared in-frame. Responsive to such a frame alignment success event, the power management module 119 causes the frames 111-114 to enter the low power state.

While in the low power state, the frame alignment logic 110 remains inactive until receiving a restart signal which triggers it to hunt for framing again. Since generally a framer can be in the locked state for the majority of time in a functioning network system, this results in power saving for most of the operational time of the system. Therefore, by disabling the frame alignment process when it is not needed, significant power reduction can be advantageously obtained.

The present disclosure is not limited to any specific wake-up event based on which a restart signal can be generated. Nor is it limited to any specific functional component that serves to detect a wake-up event and accordingly generate such a restart signal. In the examples described herein, a metric such as "excessive number of errors" (with reference to a threshold) is used to indicate whether data processing at a receiver has shifted to an out-of-frame state while the frame alignment logic is inactive or otherwise in the low power state. However, it will be appreciated that a wide range of other suitable metrics can be used as an indication of an out-of-frame state without departing from the scope of the present disclosure.

In the illustrated example, while the frame alignment logic 110 remains inactive, the FEC decoder 140 continues to monitor the errors and perform error correction on the reconstructed data stream 131. Upon detecting an excessive error (e.g., 3 or more uncorrectable consecutive codewords), the FEC generate a restart signal 141 which is supplied to the power management module 119.

For instance, the receiver 100 and its constituent components are configured in compliance with the framing protocol defined for 100GBASE-R signals that are FEC encoded using the RS (528,514,10) or RS(544,514,10) FEC defined in IEEE Std. 802.3™-2015 Clause 91. In this example, the 4 physical lanes 101-104 (PL #0 . . . PL#3) collectively provide 100 G bps input data streams. However, this discussion is merely exemplary and the present disclosure is applicable to any other combination of number of lanes and data rate. Once each framer (e.g., 111 or 112) has acquired lock (or transitioned to the in-frame state), it waits until 3 or more uncorrectable codewords are detected by the FEC decoder 140 to trigger the restart signal 141 for restarting the hunt for lock. In some other embodiments, other ways can be used to trigger the framers to restart, for example if the number of detected error bits exceeds a threshold and so on. As long as a restart signal 141 is not received (which is the case with a healthy or low-error input data stream received), the frame alignment logic 110 that would otherwise search for framing patterns can remain in the low power state.

Figure 2:
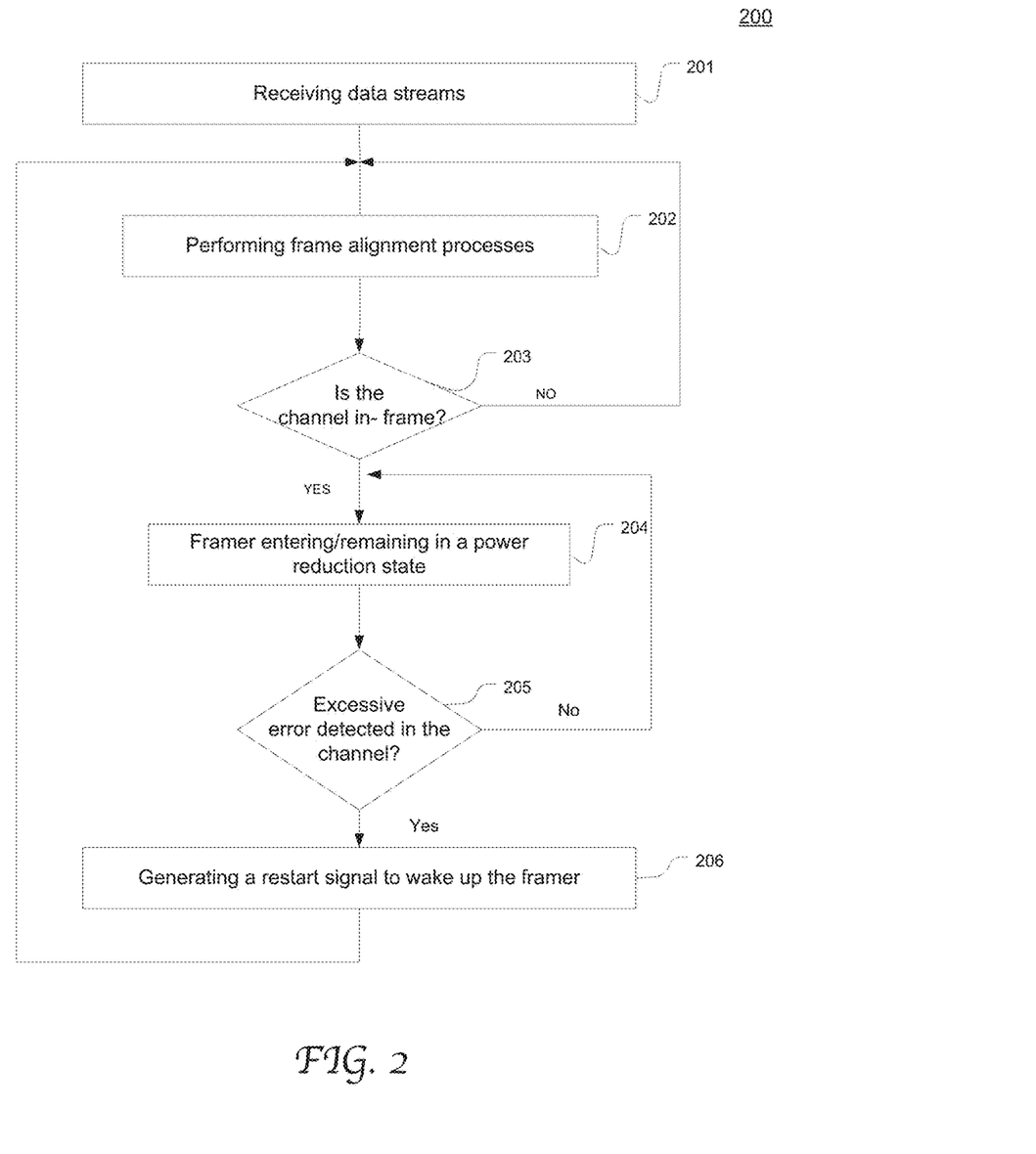
FIG. 2 is a flow chart depicting an exemplary process of frame alignment with a power reduction state in accordance with an embodiment of the present disclosure.

FIG. 2 is a flow chart depicting an exemplary process 200 of frame alignment with a power reduction state in accordance with an embodiment of the present disclosure. Process 200 can be performed by the frame alignment logic 110 as shown in FIG. 1 for example.

At 201, the data streams associated with a communication channel are received by the framers in the frame alignment logic 110. Each framer may receive a data stream in blocks of M bits as provided by a parallel M-bit data bus coupled to the framer, as described in greater detail with reference to FIGS. 3 and 4. At 202, each framer performs a frame alignment process to locate a sequence of consecutive bits in the data stream that match an expected FAW, thereby determining frame boundaries in the data stream. As described above, a framer may need to locate an expected FAW at multiple locations in the data stream before declaring in-frame.

At 203, it is determined whether all the data streams of the same channel are in-frame. If not, the framers continue to search for the FAWs. On the other hand, if all the framers are in-frame, the frame alignment processes are disabled as the frame alignment logic enters a power reduction state at 204. In this state, the framers are powered down or otherwise remain inactive to save power. However, the power management module in the frame alignment logic remains powered such that it can receive a restart signal to wake up the framers.

The data streams output from the frames are aggregated and reconstructed into a processed stream and supplied to the FEC decoder for error correction. At 205, it is determined whether the selected metric used to indicate an out-of-frame state of the data streams has reached a threshold value. If the detected error has not reached the threshold, the frame alignment logic remains inactive; and if yes, a restart signal is generated to wake up the framers and so restart frame alignment processes at 206. In some embodiments, the selected metric corresponds to the number of consecutive uncorrectable codewords as determined through an FEC process. For instance, an out-of-frame state is declared upon 3 or more uncorrectable consecutive bits being detected. The entrance into and exit from the power reduction state can be controlled by a power management module in the frame alignment logic, as shown in FIG. 1. The restart signal can be generated by the FEC decoder.

Current PHY chips use framers with parallel circuits such as comparators to search at different portions of the data bus for transitioning to in-frame or out-of-frame states. N identical copies of the same circuit (e.g., N comparators) are used to compare the fixed framing pattern with the incoming data in parallel, each comparator looking at a different portion (or window) of the data bus. The number of comparators equals the number of windows (N) to be checked in the block of data provided by the data bus at one time.

Figure 3:
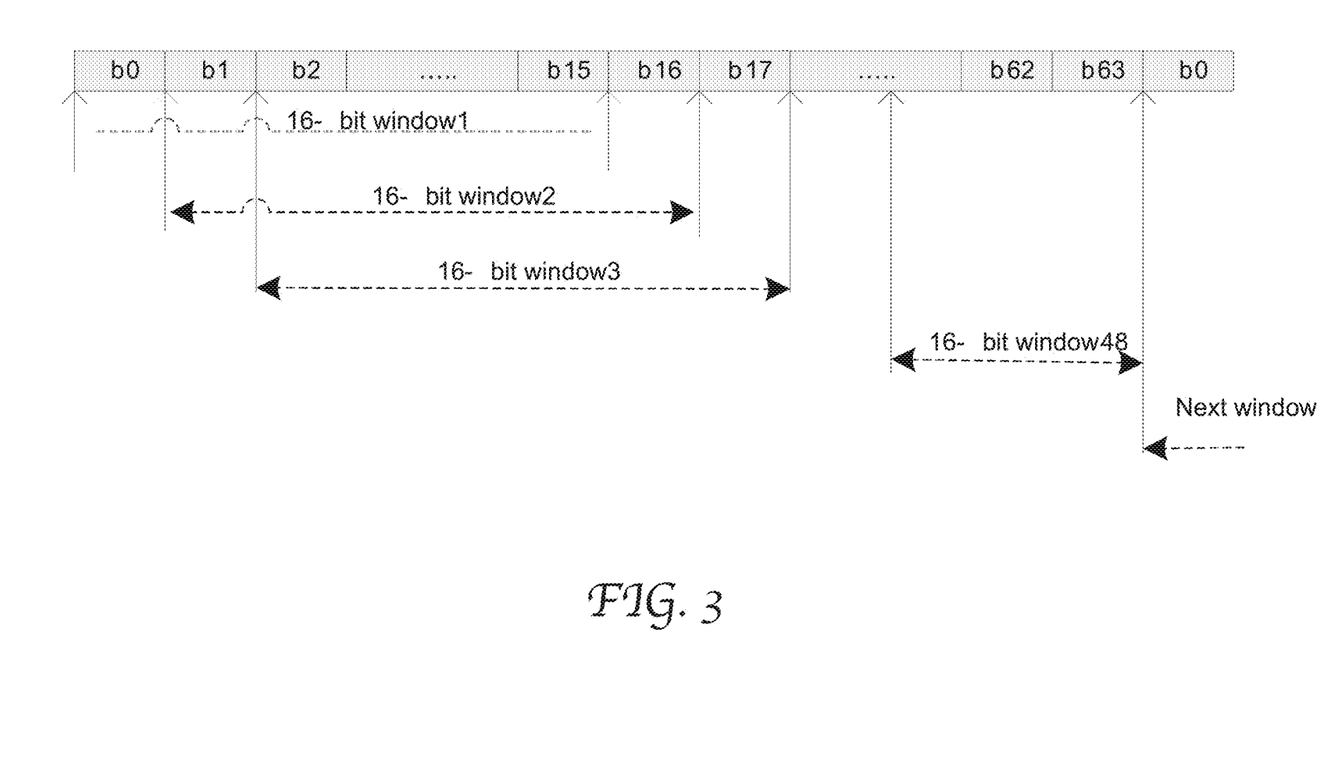
FIG. 3 illustrates multiple windows in a block of parallel data that can be serially processed by a comparator in a framer in accordance with an embodiment of the present disclosure.

Embodiments of the present disclosure use one comparator to look at the different data bus locations serially, e.g., starting from the first and then moving to the next (i.e. to the subsequent bit location) and so on. This advantageously eliminates a significant number of comparator gates as well as all the power associated with the toggling of these gates. In some other embodiment, 2 or 3 (or M) comparators are used (M<N, wherein N is the number of windows to be checked in a block of parallel data). FIG. 3 illustrates an example of multiple windows in a block of parallel data that can be serially processed by a comparator in a framer in accordance with an embodiment of the present disclosure.

In this example, a sequence of data bits b0-b63 is received at the input interface of a receiver and converted to a parallel block of data, e.g., by a serial-to-parallel converter 121 as shown in FIG. 1. The parallel block of data is supplied to the framer through a 64-bit (R-bit in the general case) parallel data bus. Assuming the framing pattern to be located has a 16-bit pattern. A single 16-bit comparator (can be a W-bit one in the general case) is searching for the 16-bit fixed frame pattern within the 64-bit data block (can be an R-bit one in the general case, R>W) in successive periods of time. In these successive clock periods of time, the serial-to-parallel converter 121 and the data bus maintains the same 64-bit data block output. As shown in FIG. 3, the comparator first processes window 1, and if it finds a framing candidate, it stops there; otherwise it moves to window 2, and so on.

An alternative implementation is that 2 comparators are used. For instance, when comparator 1 searches in window 1, comparator 2 searches in window 33. This increases the power and gate count accordingly compared to the single-comparator configuration. It can be generalized to multiple comparators in a framer, with each comparator configured to serially compare a plurality of windows of a parallel data block with the framing pattern. The number of comparators (M) is smaller than the number of windows (N) to be checked in a block of data that is provided by the data bus. The multiple comparators can operate in parallel to reduce Maximum Average Reframe Time (MART).

Figure 4:
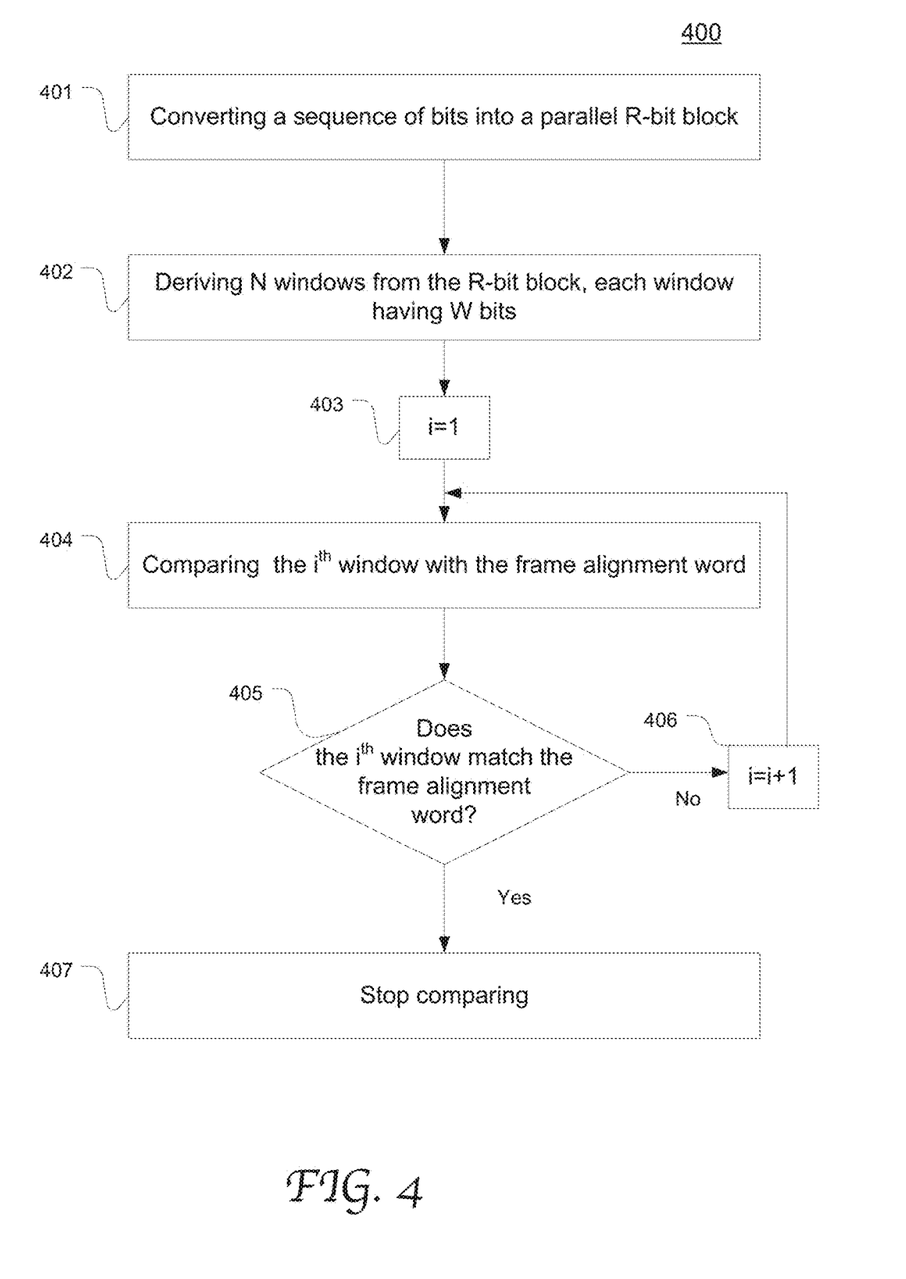
FIG. 4 is a flow chart depicting an exemplary process of using one comparator to serially compare multiple windows in a block of data provided by a parallel data bus in accordance with an embodiment of the present disclosure.

FIG. 4 is a flow chart depicting an exemplary process 400 of using one comparator to serially compare multiple windows in a block of data provided by a parallel data bus in accordance with an embodiment of the present disclosure. Process 400 can be performed by a receiver as shown in FIG. 1. At 401, a sequence of bits in a data stream are captured and converted into a parallel R-bit block of data, e.g., by a serial-in, parallel-out shift register at the input interface as shown in FIG. 1. At 402, N windows are derived from the R-bit block of data. The plurality of windows can be supplied to the W-bit comparator in a selected sequence as controlled by the shifting logic. Each window has W bits and is to be compared with the expected W-bit FAW at the comparator. At 403, the window index is initialized (i=1). At 404, the $i^{th}$ window is compared with the expected FAW.

If the $i^{th}$ window matches the pattern of the expected FAW as determined at 405, the comparator may stop processing the rest of the windows. If it does not match, the comparator moves to process the next window (the $(i+1)^{th}$ window) as shown at 406 and 404. The foregoing 404-406 are repeated until the comparator finds a match or finishes checking all the windows in the block of data. In the later case, process 400 is repeated for another sequence of R bits data in the same data stream. It will be appreciated that a comparator can successively process multiple windows in any suitable order as controlled by the associated shifting logic.

In some other embodiments, more than one comparator is used to search for the FAW in the incoming data, with each comparator configured to serially compare multiple windows of a parallel R-bit block (as provided from a parallel data bus) with the FAW. Multiple comparators in the framer may operate in parallel to search for the FAW at different windows. The number of comparators (M) is less than the number of windows (N) that are provided from a parallel data bus. Compared with a conventional framer where the number of comparators equal to the number of windows and all the windows are checked simultaneously, this configuration can significantly reduce the requisite comparator count and so the gate count as well as the chip area in a framer, thereby advantageously reducing associated power consumption.

According to the conventional art, in case that a receiver is configured to support multiple (K) lanes, the same number of framers (L=K) are used and operate in parallel to find the framing positions in respective data streams, one framer per lane. This design requires high gate count as well as associated power consumption.

According to embodiments of the present disclosure, one framer is configured to process multiple lanes (K) serially, for example starting from the first lane and then moving to the next and so on. This can advantageously eliminate a significant number of framer gates in a receiver as well as all the power needed for toggling of these gates. Alternatively, 2, 3 or L framers are used to process the L lanes with L<K.

For example, in the framing protocol defined for 100GBASE-R signals that are FEC encoded using the RS (528,514,10) or RS(544,514,10) FEC defined in IEEE 802.3™-2015 Clause 91, there are 4 physical lanes (PL#0 . . . PL#3) carrying the 100GBASE-R signal. According to the present disclosure, data streams of these lanes can be all fed to a single framer. The framer sifts through them serially (one by one) and attempts to acquire framing for each one of them. This can generalized to any number of lanes. An alternative implementation is that 2 framers are used, where one framer is allocated to PL#0 and PL#1, while the other is allocated to PL#2 and PL#3 for example. Compared to the single-framer implementation, this reduces the MART by a factor of 2 but increases the power and gate count accordingly.

Figure 5A:
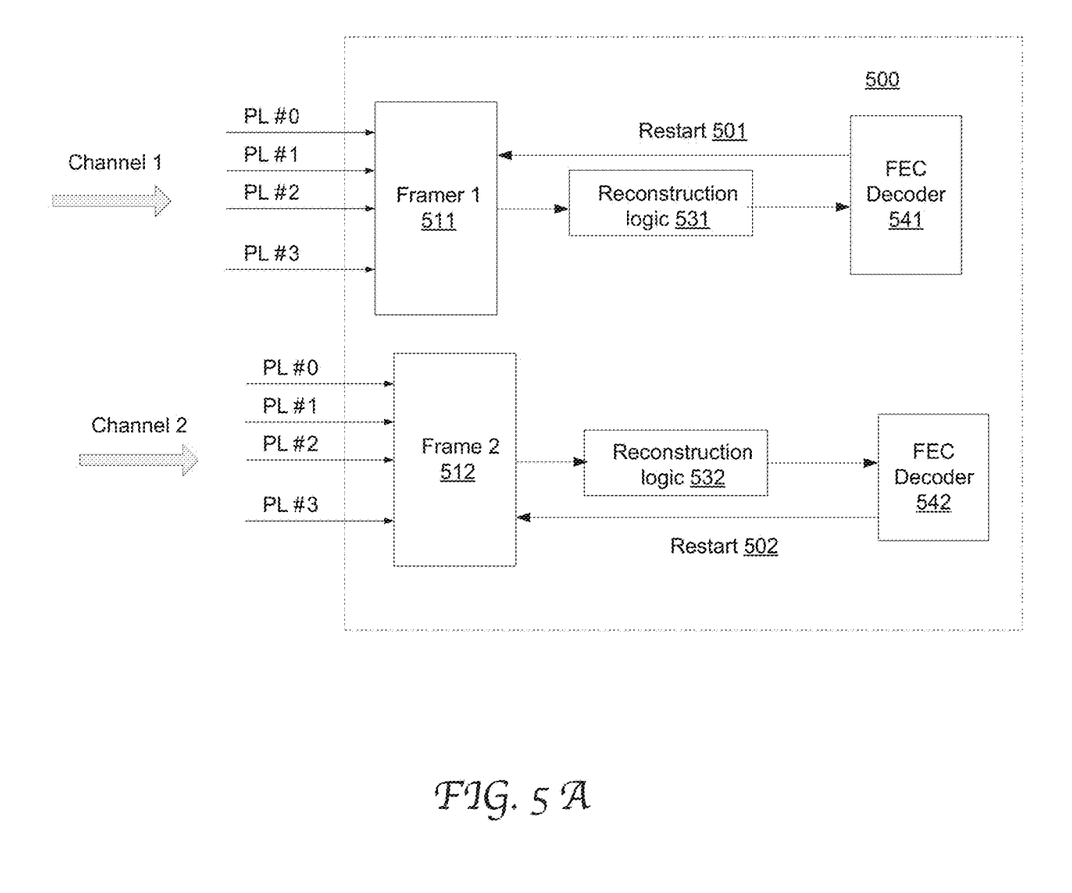
FIG. 5A illustrates the configuration of an exemplary receiver including two framers each used to process multiple lanes successively in accordance with an embodiment of the present disclosure.

FIG. 5A illustrates the configuration of an exemplary receiver 500 including two framers 511 and 512 each used to process multiple lanes successively in accordance with an embodiment of the present disclosure. In this example, two framers 511 and 512 are used to perform frame alignment on the data streams of two channels (Channel 1 and Channel 2) with each channel associated with 4 lanes (PL#0 . . . PL#3). The two framers 511 and 512 can operate in parallel. The framers 511 and 512 supply the data streams to their respective reconstruction logic 531 and 532 wherein data of each channel is reconstructed. The reconstructed data signals are then fed to their respective FEC decoder 541 and 542. If the FEC decoder 541 or 542 detects that the reconstructed data of the corresponding channel (Channel 1 or Channel 2) has a greater-than-threshold error, a restart signal 501 or 502 is send to the corresponding framer 511 or 512 to wake the framer up for frame alignment process.

Moreover, each framer 511 or 512 may be individually controlled for entering and exiting a power reduction state. More specifically, each framer 511 or 512 can declare a frame alignment success event with respect to the corresponding channel after frame alignment is achieved for all 4 lanes. Following the event, the framer 511 or 512 can then enter a power reduction state as described in greater detail with reference to FIGS. 1 and 2. A framers 511 or 512 supplies the data streams to the corresponding reconstruction logic 531 or 532 wherein data of each channel is reconstructed and fed to the corresponding FEC decoder 541 or 542. If the corresponding FEC decoder detects that the reconstructed data of that channel has a greater-than-threshold error, a restart signal 501 or 502 is sent to the corresponding framer 511 or 512 to wake it up for frame alignment process.

Figure 5B:
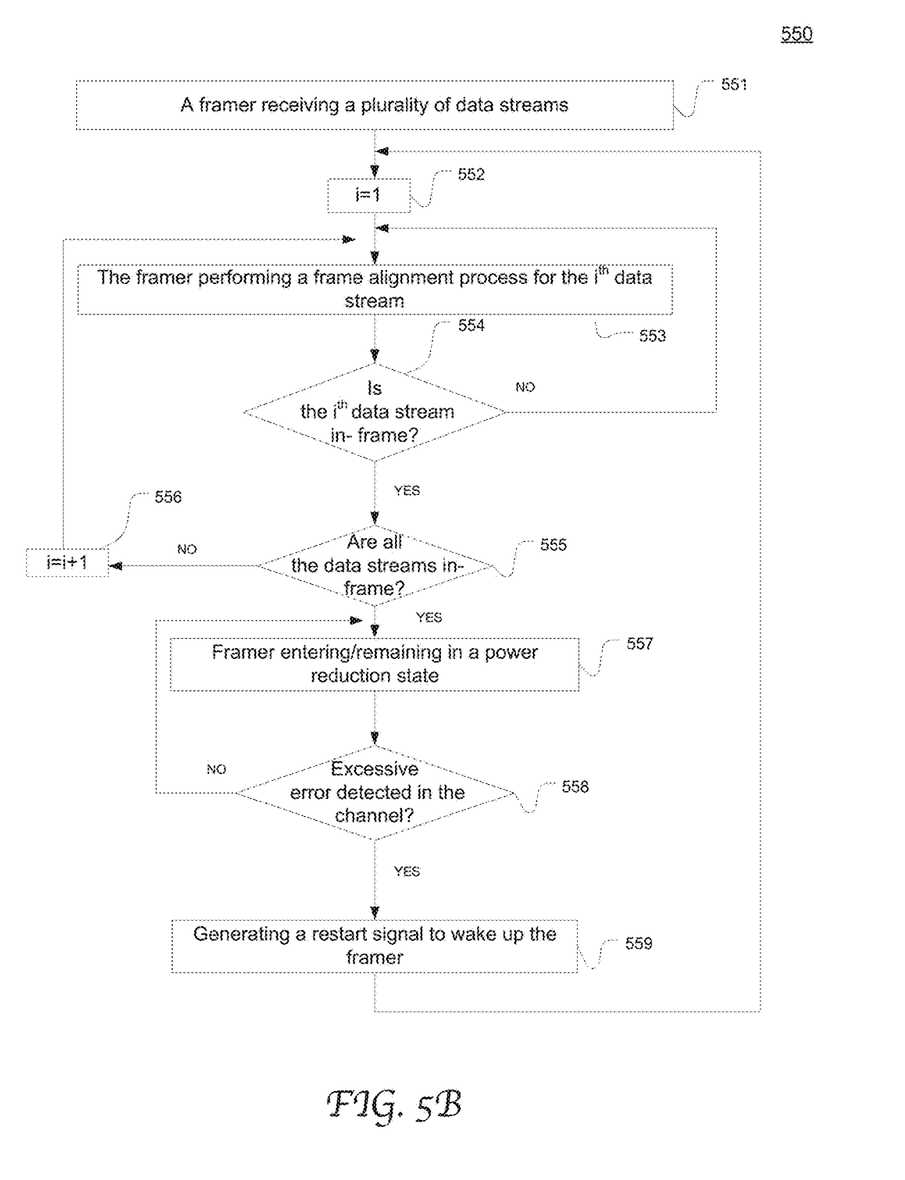
FIG. 5B is a flow chart depicting an exemplary process of frame alignment by using a framer to successively process multiple data streams in accordance with an embodiment of the present disclosure.

FIG. 5B is a flow chart depicting an exemplary process 550 of frame alignment by using a framer to successively process multiple data streams in accordance with an embodiment of the present disclosure. Process 550 can be performed by a framer 511 or 512 in FIG. 5A for example. At 551, a framer receives a plurality of data streams which may be associated with the same channel (e.g., Channel 1 or 2 in FIG. 5A). At 552, the data stream index i is initialized. The framer performs a frame alignment process for the $i^{th}$ data stream at 553. If the $i^{th}$ data stream achieves frame alignment as determined at 554 and not all the streams are aligned as determined in 555, the data stream index i increments at 556, and the framer proceeds to process the next data stream at 556.

If all the data streams have achieved frame alignment as determined in 555, the frame enters a power reduction state 557. If an excessive error is detected in the channel at 558, a restart signal is generated to wake up the framer at 559 and the foregoing 552~559 is repeated. Further, the foregoing 551-559 can be performed by multiple framers in parallel on different channels, as shown in FIG. 5A.

According to the conventional art, in cases where a receiver is configured to support multiple (B) channels, the same number of framers (C=B) are used and operate in parallel to find the framing positions in respective data streams, one framer per channel. This requires high gate count and high power consumption associated therewith.

According to the embodiments of the present disclosure, one framer can used to perform frame alignment processes for multiple channels (B) serially, for example starting from the first channel and then moving to the next and so on. This reduces a significant number of framer gates as well as all the power consumption associated with the toggling of the gates therein. Alternatively, a compromise can be made where 2, or 3 (or C) Framers are used (C<B).

For example, a multi-channel receiver is configured to support eight 100GBASE-R channels which are FEC encoded using the RS-FEC sublayer defined in IEEE 802.3™-2015 Clause 91. According to the present disclosure, all 8 channels can be fed to a single framer. The framer sifts through them serially (one by one) and attempts to acquire framing for each one of them. This can be generalized for any number of channels. An alternative implementation is that 2 framers are used, so that one framer is allocated to half the channels (e.g. Channels 0 . . . 3), while the other framer is allocated to the other half (Channels 4 . . . 7). The two framers may operate in parallel. This reduces the MART by a factor of 2 but increases the power and gate count accordingly. This can be generalized to any suitable number of framers.

Figure 6A:
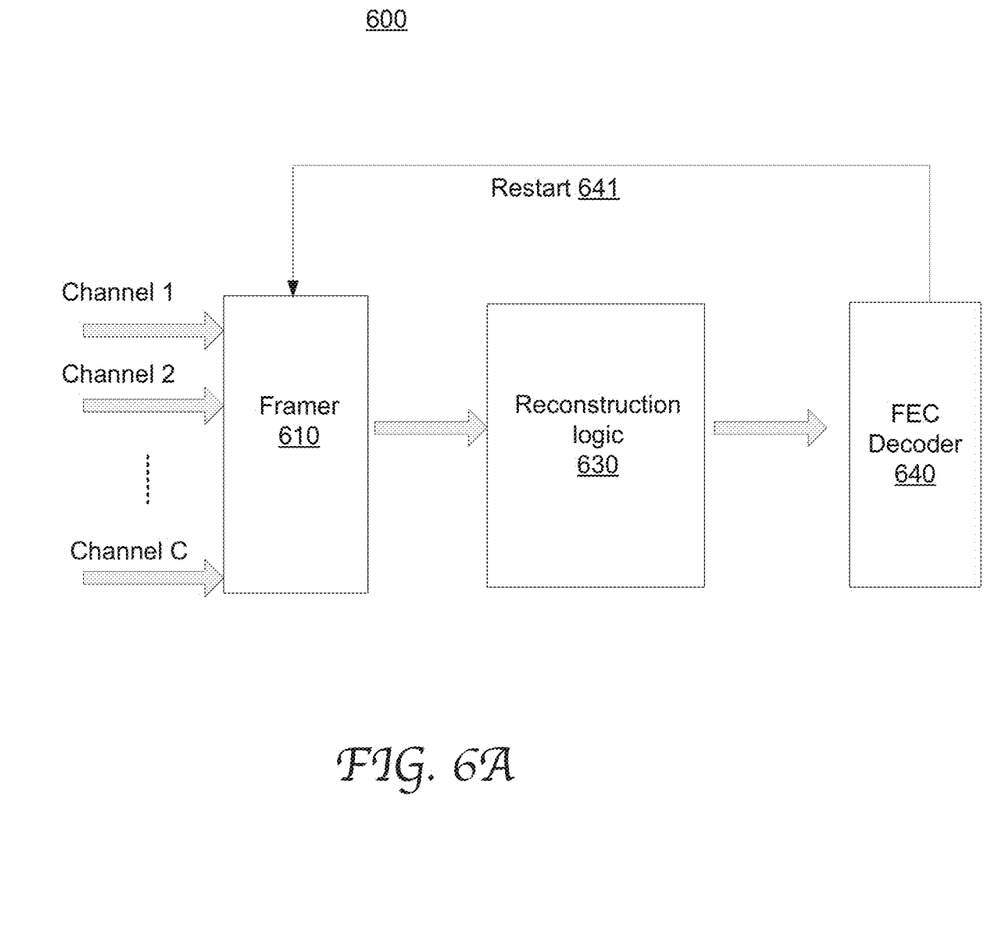
FIG. 6A illustrates an exemplary receiver using a framer to process data of multiple channels serially in accordance with an embodiment of the present disclosure.

FIG. 6A illustrates an exemplary receiver 600 using a framer 640 to process data streams of multiple channels serially in accordance with an embodiment of the present disclosure. Each channel may be associated with one or more physical lanes (not explicitly shown). As controlled by a power management module (as shown in FIG. 1), once the framer 610 successfully achieves frame alignment for a particular channel, the frame may stop the frame alignment process for that channel. The reconstruction logic 630 individually reconstructs data for each channel and feeds the reconstructed data to the FEC decoder 640. If the FEC decoder 640 detects that the reconstructed data of a channel has an excessive error which indicates that the channel is "out-of-frame", a restart signal 641 is sent to the framer 610 to restart the frame alignment process for the out-of-frame channel. The restart signal may include information of the channel identification.

Figure 6B:
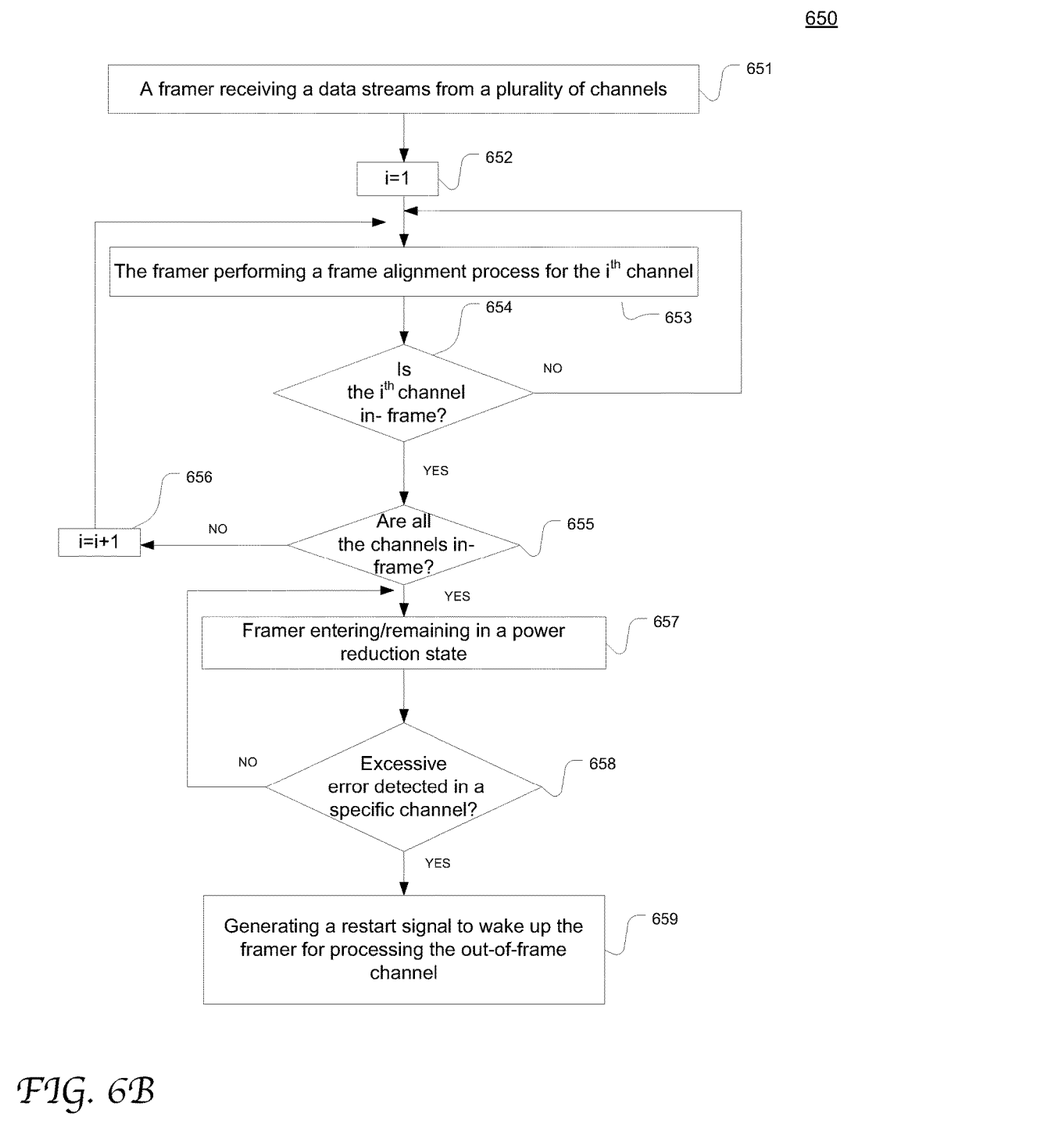
FIG. 6B is a flow chart depicting an exemplary process of frame alignment by using a framer to successively process data of multiple channels in accordance with an embodiment of the present disclosure.

FIG. 6B is a flow chart depicting an exemplary process 650 of frame alignment by using a framer to successively process data of multiple channels in accordance with an embodiment of the present disclosure. Process 650 can be performed by the framer 610 in FIG. 6A for example. At 651, the framer receives data streams of a plurality of channels. At 652, the channel index i is initialized. The framer performs frame alignment processes for the $i^{th}$ channel at 653. If the $i^{th}$ channel achieves frame alignment as determined at 654 and not all channels are in-frame as determined in step 655, the index i increments at 656, and the framer proceeds to process the next channel at 656.

If all the channels associated with the framer have achieved frame alignment as determined in 655, the frame enters a power reduction state 657. If an excessive error is detected in an identified channel at 658 which indicates that the channel is "out-of-frame," a restart signal is generated to wake up the framer at 659 and so restart the frame alignment processes on the identified channel. After this channel becomes in-frame again, the framer may go back to the power reduction state. The foregoing 655 and 657~659 is repeated each time a channel is determined to be out-of-frame. However, it will be appreciated that this discussion is merely exemplary, the framer can be controlled to enter/exit a power reduction mode in any other suitable manner. Further, the foregoing 651-659 can be performed by multiple framers in parallel on different groups of channels.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A receiver in a telecommunication system, the receiver comprising:
an input interface configured to receive a data stream comprising a plurality of frames, wherein a respective frame of said plurality of frames comprises a frame alignment word;
a serial-to-parallel converter coupled to said input interface and configured to output a block of R bits from said data stream in parallel; and
frame alignment logic coupled to said serial-to-parallel converter, wherein said frame alignment logic comprises a comparator of W bits configured to serially compare a plurality of W-bit windows with said frame alignment word to locate said frame alignment word in said data stream, wherein said serial-to-parallel converter is configured to maintains said block of R bits during said comparator serially comparing said plurality of W-bit windows with said frame alignment word, wherein each of said plurality of W-bit windows is extracted from said block of R bits and has a respective location in said block of R bits, and wherein R and W are integers greater than 0 and W<R.

2. The receiver of claim 1, wherein said frame alignment logic comprises a plurality of comparators of W bits, wherein a respective comparator of said plurality of comparators is configured to serially compare multiple W-bit windows of said plurality of W-bit windows with said frame alignment word, and wherein said plurality of comparators operate in parallel.

3. The receiver of claim 2, wherein said respective comparator is configured to compare said multiple W-bit windows with said frame alignment word in successive periods of time.

4. The receiver of claim 1, wherein said frame alignment word comprises W bits, and wherein said plurality of frames are of a same length.

5. The receiver of claim 1, wherein said serial-to-parallel converter is coupled to said frame alignment logic through an R-bit parallel data bus.

6. The receiver of claim 1, wherein said frame alignment logic is configured to enter a power conservation state responsive to said frame alignment word being located in said data stream.

7. A receiver in a telecommunication system, said receiver comprising:
an input interface configured to receive a data stream comprising a plurality of frames, wherein a respective frame of said plurality of frames comprises a frame alignment word;
a data bus coupled to said input interface and configured to output a block of R bits from said data stream in parallel; and
a comparator coupled to said data bus configured to successively compare a plurality of W-bit windows with said frame alignment word to locate said frame alignment word in said data stream, wherein said plurality of W-bit windows have respective bit locations within said block of R bits, and wherein R and W are integers, wherein said comparator is configured to compare said plurality of W-bit windows with said frame alignment word in successive clock cycles, and wherein said data bus is coupled to a serial-to-parallel converter configured to maintain said block of R bits during said successive clock cycles.

8. The receiver of claim 7 comprising a framer coupled to said data bus and comprising a plurality of comparators, said plurality of comparators comprising said comparator, wherein each comparator in said framer is configured to successively compare a respective plurality of W-bit windows with said frame alignment word.

9. The receiver of claim 8, wherein said framer is configured to enter a power reduction state based on an event that said frame alignment word being located in said data stream.

10. The receiver of claim 9 further comprising error detection logic coupled to said framer, wherein said framer is further configured to exit said power reduction state responsive to said error detection logic detecting an error that is greater than a prescribed limit.

11. The receiver of claim 8, wherein said framer is configured to cause said plurality of comparators to stop comparing said block of R-bits with said frame alignment word responsive to said frame alignment word being located in said data stream.

12. The receiver of claim 8, wherein said plurality of comparators are configured to operate in parallel.

13. The receiver of claim 7, wherein said frame alignment word comprises W bits, and wherein said plurality of frames have a same length.

14. A method of frame alignment at a receiver in a telecommunication system, said method comprising:

receiving a data stream comprising a plurality of frames, wherein a respective frame of said plurality of frames comprises a frame alignment word;

converting a sequence of R bits from said data stream to a parallel W-bit block; and successively comparing a plurality of W-bit windows with said frame alignment word by a comparator to locate said frame alignment word in said data stream, wherein said plurality of W-bit windows have respective bit locations within said parallel R-bit block, and wherein R and W are integers.

15. The method of claim 14 further comprising comparing multiple W-bit windows with said frame alignment word in parallel by multiple comparators, wherein said multiple W-bit windows have respective bit locations within said parallel R-bit block.

16. The method of claim 15 further comprising disabling said successively comparing
based on an event that said frame alignment word being located in said data stream.

17. The method of claim 16 further comprising exiting said power reduction state responsive to a detected error being greater than a prescribed limit, wherein said detected error is detected through a forward error correction process.

18. The method of claim 14 further comprising stopping comparing said plurality of W-bit windows with said frame alignment word responsive to said frame alignment word being located in said data stream.

* * * * *